Figure 1:
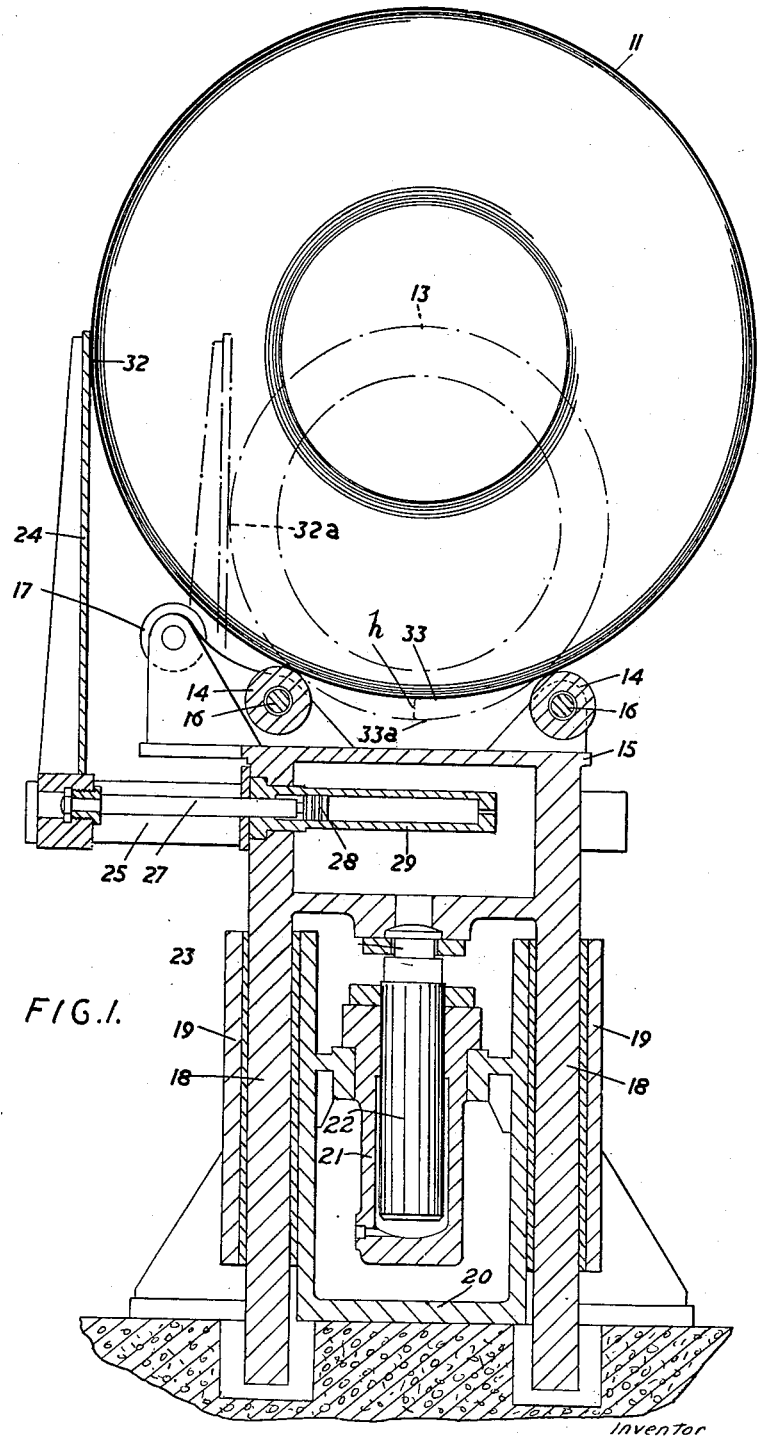

Oct. 16, 1951     R. G. RUSSELL     2,571,947
ADJUSTMENT GAUGE FOR COILS
Filed Aug. 12, 1948     8 Sheets-Sheet 1

Inventor
ROBERT GORDON RUSSELL
By
Bailey, Stephens & Huettig
Attorneys

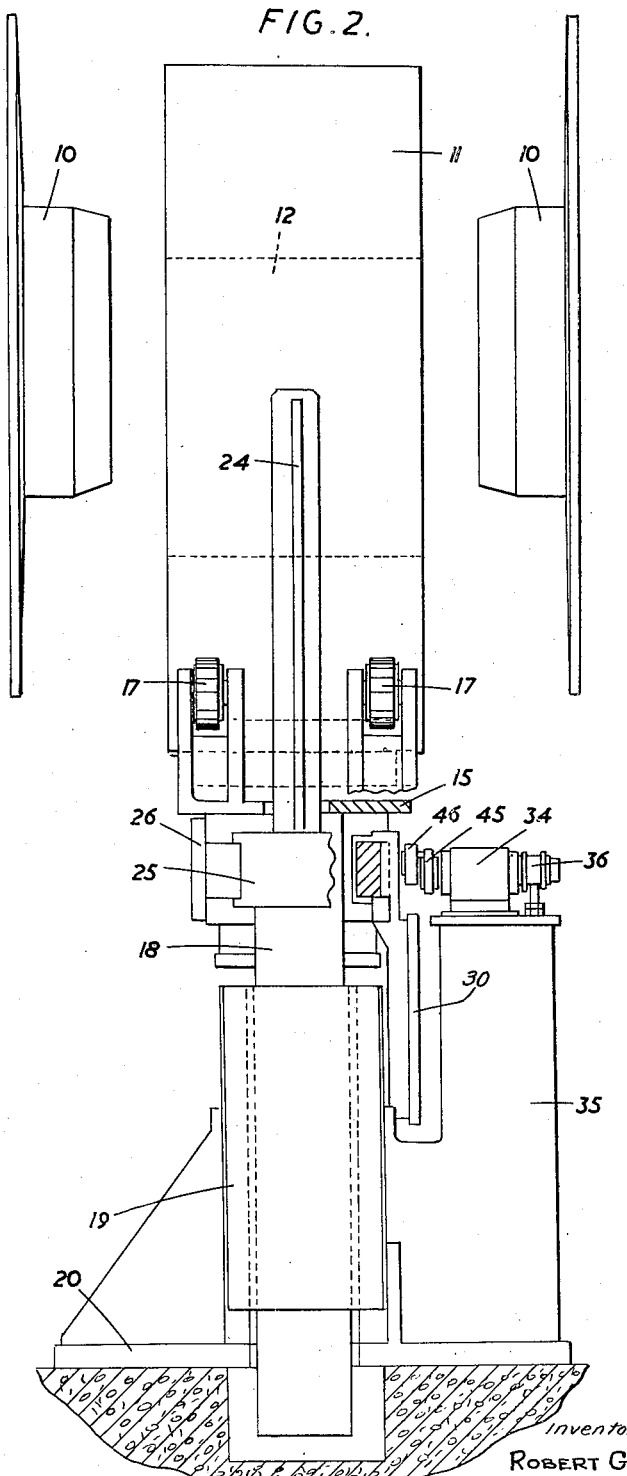

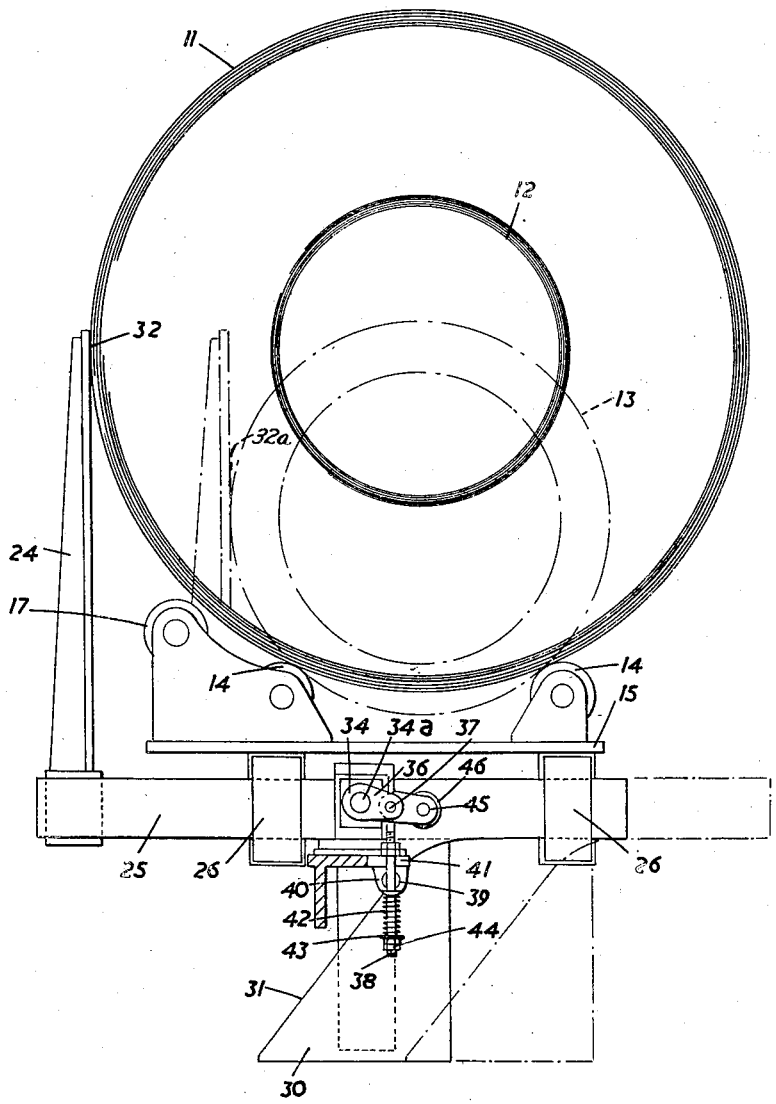

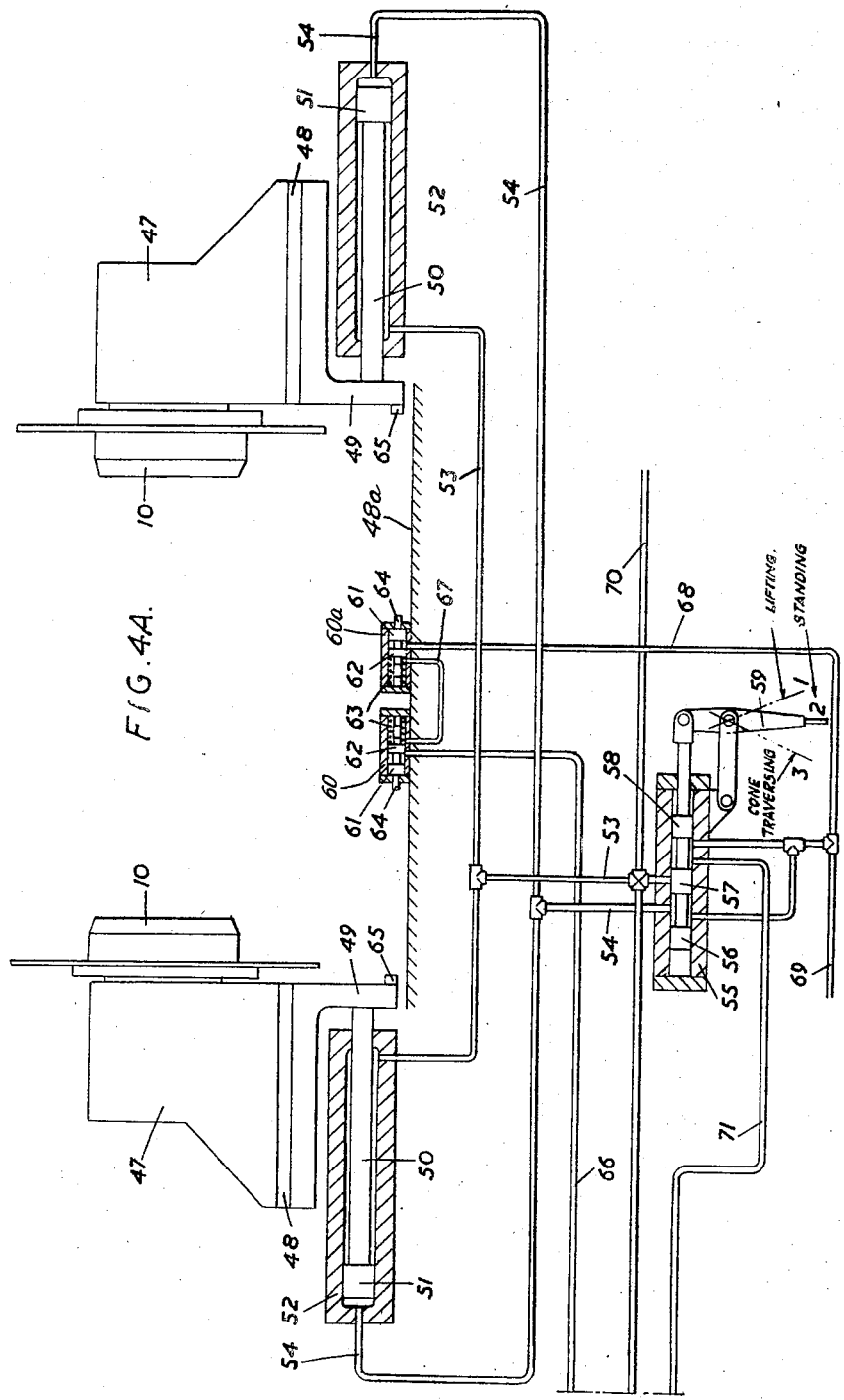

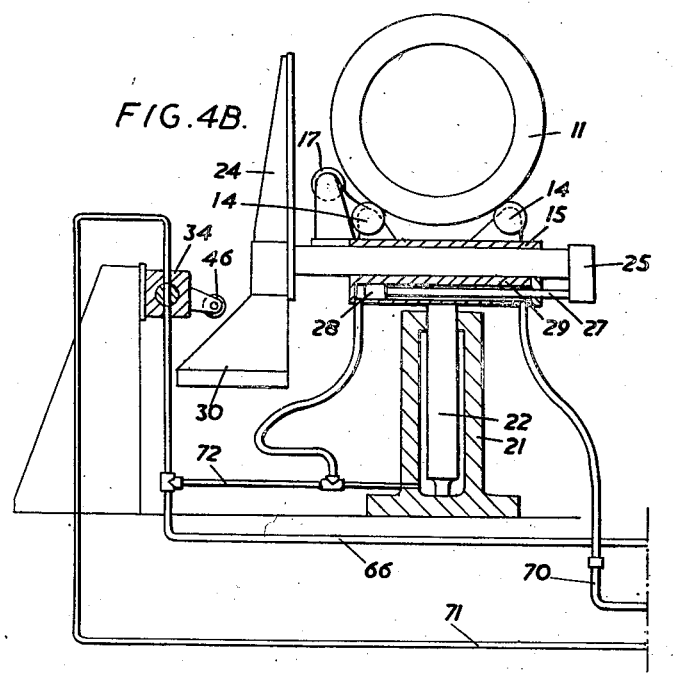

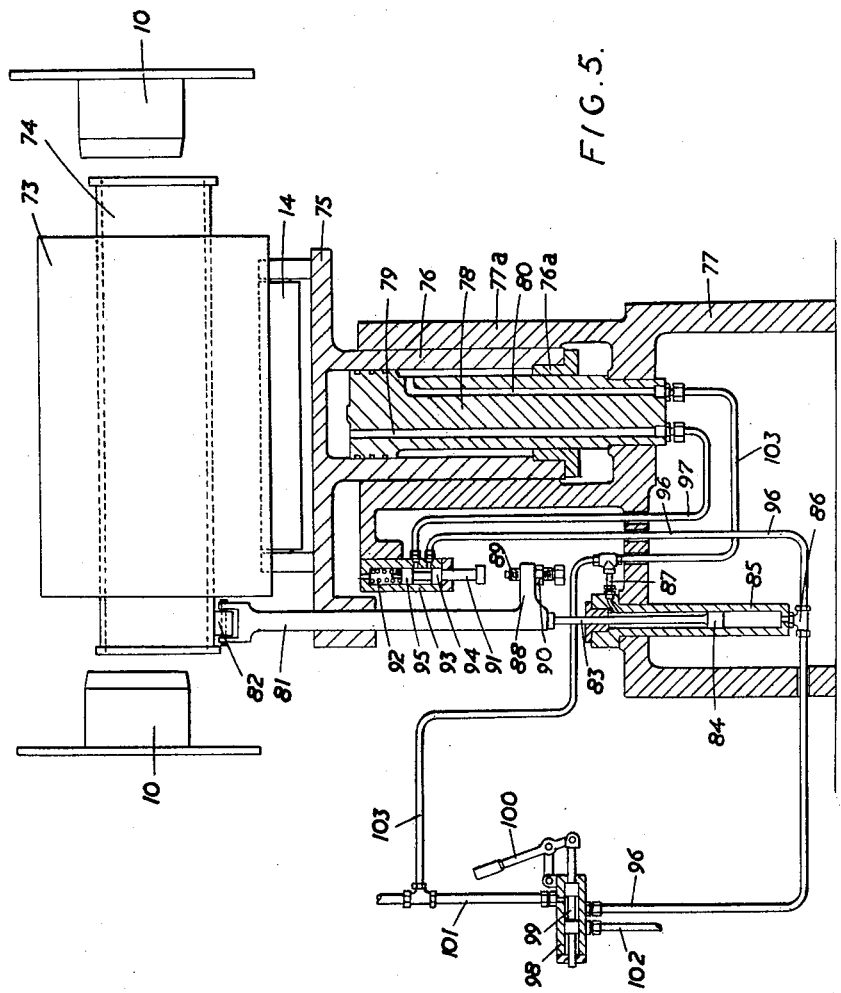

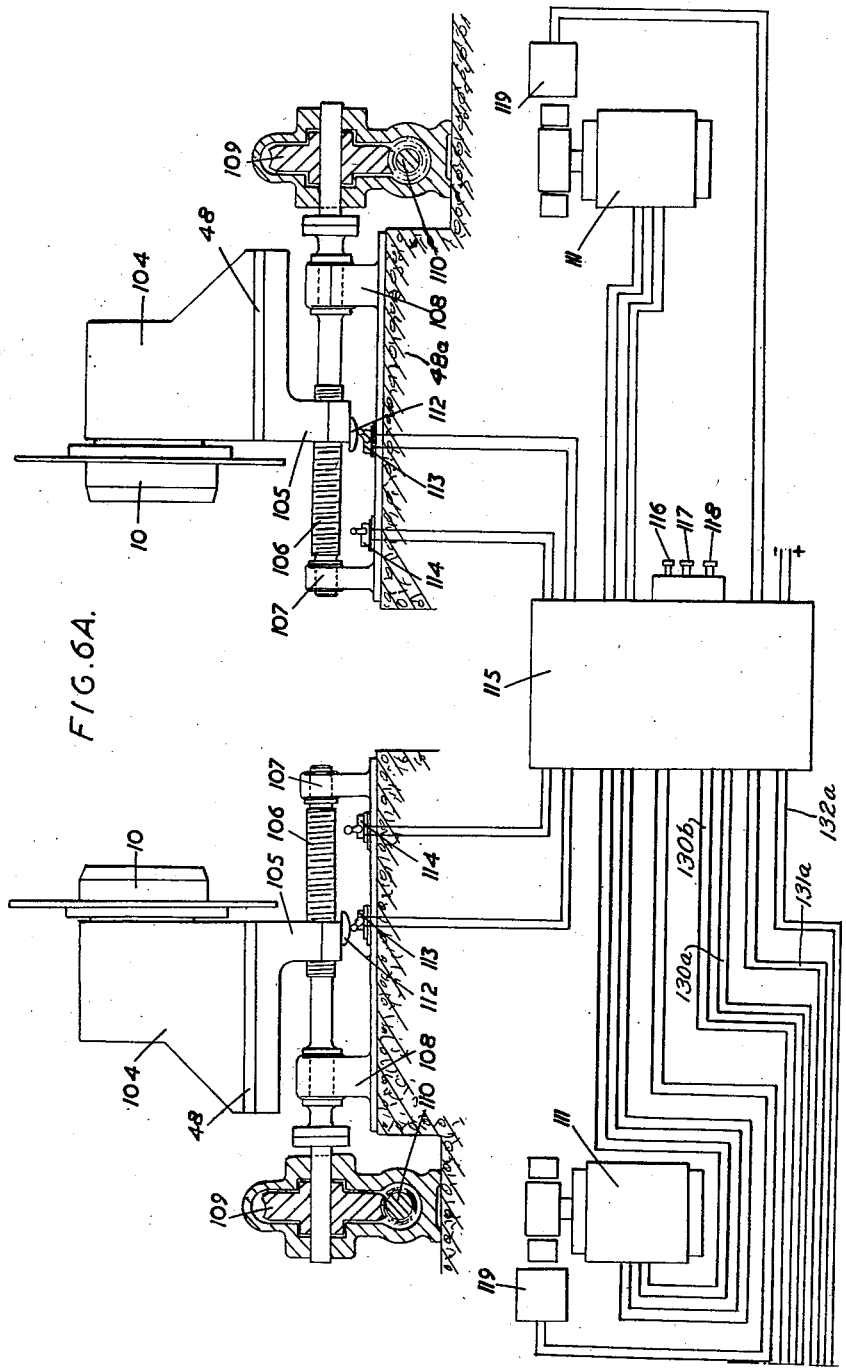

Oct. 16, 1951  R. G. RUSSELL  2,571,947
ADJUSTMENT GAUGE FOR COILS
Filed Aug. 12, 1948  8 Sheets-Sheet 8
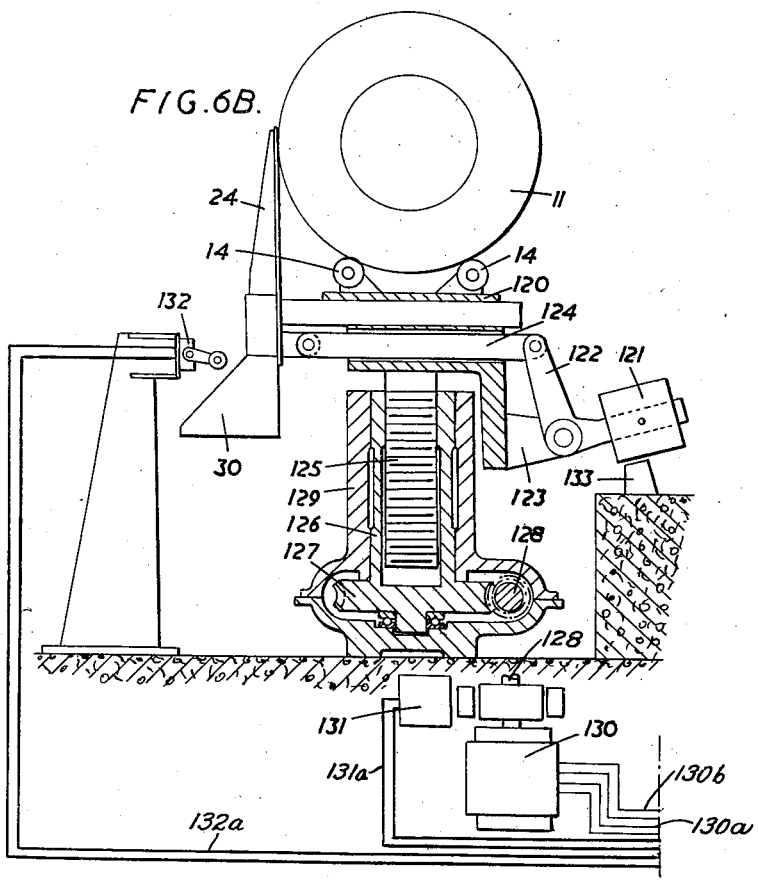
Inventor
ROBERT GORDON RUSSELL
By
Bailey, Stephens & Huettig
Attorneys Patented Oct. 16, 1951

2,571,947

UNITED STATES PATENT OFFICE 2,571,947

ADJUSTMENT GAUGE FOR COILS

Robert Gordon Russell, Sheffield, England, assignor to Davy and United Engineering Company Limited, Sheffield, England Application August 12, 1948, Serial No. 43,861
In Great Britain August 19, 1947

9 Claims. (Cl. 242—78)

This invention relates to adjusting gauge for coils, and especially, but not exclusively, to lifting gear for strip uncoilers such as are used in conjunction with strip rolling mills.

Uncoilers may be of various types having cones, drums, or baskets on to which the coils to be unwound are placed, and the coils are sometimes wound on spools before being placed on the uncoiler. The external diameter of the coil to be unwound may vary within wide limits, and hitherto the operation of ensuring that a coil is correctly centered in the uncoiler has required attention for each coil according to its individual dimensions.

It is an object of the invention to provide a locating gear which will accommodate a load, assess its relevant dimensions, and automatically locate it relatively to a predetermined axis. Such location may, for example, be in a horizontal plane, and relatively to a vertical axis, or it may be in a vertical plane, and relatively to a horizontal axis. Hence, it is a further object of the invention to provide a gear which will accommodate any coil of a size normally encountered and will automatically lift it to the required position for entering on to an uncoiler.

In accordance with the invention a power-actuated automatic locating gear comprises a cradle to receive a load, a gauging system to assess the relevant dimensions of the load, and operating means, including a hoist, arranged to be controlled by the gauging system, to locate the load relatively to a predetermined axis.

Means are provided so that the sequence of operations is carried on automatically. Either hydraulic or electric power may be used, with the proper controls applicable in either case.

The invention further includes a strip uncoiler, employing either hydraulic or electric power, in which cones for holding the coil are brought automatically into position after the coil is centered on a predetermined axis, which coincides with the axis of the cones, and in which the locating gear is returned to its initial position, the whole being accomplished by an automatic sequence of operations.

Various forms of the invention wil be described with reference to the accompanying drawings, in which:

Figure 1 is a diagrammatic side elevation, partly sectioned, of a hydraulically operated hoist for a strip uncoiler, Figure 2 is a diagrammatic front elevation partly sectioned, of the hoist, Figure 3 is a fragmentary side elevation of the hoist, Figure 4A is a diagrammatic front elevation, partly sectioned, of the cone operating mechanism for a hydraulic strip uncoiler, Figure 4B is a diagrammatic side elevation, partly sectioned, of the hydraulically operated cradle and hoist mechanism adapted to be used with the mechanism of Figure 4A, Figure 5 is a diagrammatic front elevatoin, partly sectioned, of another form of hydraulically operated automatic locating gear, Figure 6A is a diagrammatic front elevation, partly sectioned, of the cone operating mechanism for an electro-mechanically operated strip uncoiler, and Figure 6B is a diagrammatic side elevation, partly sectioned, of the electro-mechanically operated hoist and cradle adapted to be used with the mechanism of Figure 6A.

Referring to Figures 1 to 3, one form of the invention is employed in conjunction with a strip uncoiler having cones 10 for engagement with a coil 11 which is not wound on a spool, the locating gear or hoist being intended to lift the coil 11, with its axis horizontal, until the axis coincides with that of the cones 10, so that the cones can be entered into the aperture 12 in the coil 11. Such an apparatus has to handle coils of widely differing external diameters, but the axis of any given coil is always required to be located coincidental with the axis of the cones.

While the coil 11 is shown as an example of a large diameter coil, smaller coils such as 13, illustrated in chain-dotted lines in Figures 1 and 3, may also require to be handled.

The coil 11 is deposited by means of a crane or other suitable apparatus (not shown) on two pairs of rollers 14 mounted on a cradle 15 and rotatable on pins 16 and having their axes horizontal and parallel, a third pair of rollers 17 being provided at one side to prevent lateral displacement of the coil 11. The cradle 15 is carried by vertical legs 18 slidable in guides 19 in a base frame 20, on which is secured the cylinder 21 of a vertical hydraulic ram, the ram piston 22 being attached to the cradle 15 at 23, and the arrangement being such that the cradle 15 can be moved vertically by operation of the ram piston 22.

The cradle 15 carries a vertical gauge bar 24 mounted at the outer end of a sub-frame 25 slidable laterally in guideways in the cradle 15, said guideways being closed by cover plates 26. The sub-frame 25 is secured to the piston rod 27 of a horizontal hydraulic ram piston 28, the cylinder 29 of which is carried by the cradle 15, and operation of this ram piston causes the gauge bar 24 to be moved towards or away from the horizontal axis of the coil 11. Also secured to the sub-frame 25 and dependent therefrom is a vertically disposed plate 30, Fig. 3, having its upper edge 31 formed as a cam, the profile of which is determined according to the extent of the differences between the positions of the circumferences of the coils of maximum and minimum external diameter (such as 11 and 13 respectively) likely to be encountered, at the points 32, 32a where the circumferences of the coils are contacted by the vertical gauge bar 24, and the vertical difference $h$ (see Figure 1) between the lowest points 33, 33a of the circumferences of the maximum-size and minimum-size coils 11 and 13 respectively when they are resting on the rollers 14 in the cradle 15.

A rotary hydraulic valve 34 is mounted on an extension 35 of the base frame 20, and one end of the spindle 34a of the valve carried a spring-loaded lever arm 36. This lever is bifurcated at its outer end and carries a pin 37, on which is an adjustable spring rod 38 passing through a drilled pin 39 carried in apertured lugs 40 dependent from the upper part 41 of the extension 35 of the base frame 20. A spring 42 located around the spring rod 38 is arranged to abut against said upper part 41 and a washer 43 held by a nut 44, and urged the spring rod downwards. By this means the rotary valve 34 is normally held open. At the other end of the spindle 34a of the rotary valve 34 is a lever arm 45 provided with a roller 46 located in the path of the cam plate 30 and arranged, when the cam plate 30 contacts the roller 46 and rotates the spindle 34a of the valve, to close the valve 34.

The action of the hoist is as follows: when a coil of any size within the permissible range has been deposited upon the cradle 15, the operator actuates a hydraulic valve which energizes the piston 28 in the horizontal ram to move the sub-frame 25, so that the vertical gauge bar 24 is brought up against the side of the coil 11 and the cam plate 30 is translated laterally by a corresponding amount. When the gauge bar 24 is arrested, the rotary valve 34 which is held open by its spring-loaded lever arm 36, permits pressure to build up in the cylinder 21 of the vertical ram until the resistance of the load is overcome and the cradle 15 is raised. This upward movement, which is also imparted to the cam plate 30, continues until the cam operates the roller 46 and lever arm 45 of the rotary valve 34 to close the valve and maintain the cradle 15 and coil 11 in the required position for the coil to be entered into the uncoiler.

Should leakage take place, the spring loading of the rotary valve 34 will ensure that the valve will be opened and will cause the cradle 15 to be restored to the required position, when the cam 30 will again close the valve 34.

Reversal of the movement may be controlled by movement of the cones 10 of the uncoiler, so that when the coil 11 is safely centred and held in the uncoiler the cradle 15 and gauge bar 24 are returned to their initial position.

Figures 4A and 4B illustrate an embodiment showing how this may be performed. In these figures, the hoist is not shown in Figure 4A, but for clarity is shown separately in Figure 4B. In addition, the components of the hoist, while similar in principle to those shown in Figures 1 to 3, have been simplified and rearranged diagrammatically. Like parts are, however, given like reference numbers.

The cones 10 are rotatably mounted in cone heads 47 having lateral ribs 48 slidable in guideways on a base 48a so as to permit movement of the cone heads 47 towards or away from one another. Each cone head has a dependent lug 49 secured to a piston rod 50 of a ram piston 51 in a hydraulic cylinder 52 having pipes 53, 54 at the opposite ends thereof for the passage of hydraulic fluid. These pairs of pipes 53, 54 from the two cylinders 51 are in communication through T-junctions with one another and with the body 55 of a cut-off valve having a piston formed with lands 56, 57, 58 slidable in the body 55 under the action of a pivoted operating lever 59. Admission of hydraulic fluid to the cylinders 52 through either the pipes 53 or 54 permits of inward or outward movement of the cone heads 47 and cones 10 as required.

Between the cone heads 47 there are provided adjustable stop valves 60, 60a. Each of these has a piston formed with lands 61, 62 slidable against a compression spring 63, the piston having a projecting end 64 arranged to be contacted by a nose 65 on the dependent lug 49 of each cone head 47 when said cone head has advanced inwardly a predetermined distance. The valves 60, 60a are connected in series by pipes 66, 67, 68 with the rotary valve 34 of the hoist and the exhaust main 69 of the system. Except when operated by the cone heads 47, they are normally held closed, as shown in Figure 4A by the springs 63.

As illustrated in Figures 4A and 4B, the apparatus is in the standing position, that is, with the cones fully open and the hoist at the bottom of its stroke.

The coil 11 is placed on the rollers 14 of the cradle 15, and the operator moves the lever 59 from standing position 2 to lifting position 1. Pressure fluid is thereby admitted from the pressure main 70, through the pipe 53, to the valve 55, and through valve 55 and the pipe 71 to the branch 72. This branch serves both the main hoist cylinder 21 and the cylinder 29 of the ram operating the gauge arm 24, which is thus open to pressure fluid at both of its ends. Owing, however, to the effective area of the left-hand side of the piston 28 being greater than that of the right-hand side, and owing also to the piston 28 offering less resistance than the piston 22, the piston 28 begins to move to the right, carrying the gauge arm 24 up to the coil 11. Contact with the coil arrests the piston 28 and causes a pressure build-up in the system sufficient to overcome the resistance of the piston 22 to upward movement. The cradle 15 is then raised until the desired height of the axis of the coil 11 is reached, the design of the cam plate 30 being such, as hereinbefore stated, that this occurs automatically, irrespective of coil diameter. The valve 34 is actuated by the cam plate 30 to cut off the cylinder 21 from the pressure supply, and the fluid in the cylinder is locked so that the cradle 15 and coil 11 are kept at the required height.

The operator now moves the lever 59 from lifting position 1 through position 2 to position 3, for cone traversing. Pressure fluid is supplied, through the pipes 54 to the cone traversing cylinders 52, and the cone heads 47 move inward. This motion continues until the noses 65 on the cone heads 47 contact the projecting ends 64 of the adjustable stop valves. The operation of both valves, which is completed when both the cone heads 47 have reached the desired position, releases pressure fluid through pipe 66 from the lifting cylinder 21 which permits the cradle 15 to return by gravity to its standing position, and also from the gauge arm cylinder 29, so that the piston 28 returns, to the left, Figure 4B, under the influence of the constant pressure supply from the pipe 70.

When the operator returns the lever 59 to standing position 2, the return traversing movement of the cone heads 47 takes place, by reason of the fluid pressure in pipe 70 acting on pistons 51, and the apparatus is now in its original standing position ready to deal with another coil.

Figure 5 illustrates a form of hydraulic locating gear for use with coils wound on spools. A coil 73 is wound on a spool 74 having projecting ends arranged for engagement with the cones 10, the coil being supported on rollers 14 on the cradle 75. This cradle 75 has a downwardly dependent cylindrical skirt 76 slidable vertically in a guide 77a which forms part of the base frame 77. A piston 78 located at its lower end in a socket in the frame 77 forms, with the skirt 76, a hydraulic ram for raising or lowering the cradle 75. The piston 78 is formed with passages 79, 80 arranged to deliver and to exhaust pressure fluid to or from the upper and lower sides of its head respectively.

Slidably mounted in the cradle 75 is a vertical gauging rod 81 having at its upper end a roller 82 and supported at its lower end by the piston rod 83 of a piston 84 slidable in a vertical cylinder 85 and provided with pipes 86, 87 for the supply or exhaust of pressure fluid. The lower end of the gauging rod 81 has a projecting lug 88 which carries a contact bolt 89 adjustable vertically in the lug 88 and lockable by a locknut 90. Above this contact bolt, and in its line of vertical travel, is a plunger 91 slidable against a spring 92 in a cylinder 93 which is secured to the stationary guide 77a. The plunger 91 is formed with lands 94, 95 and serves with the cylinder 93 as a valve to permit or prevent communication between pipes 96, 97 connected with the cylinder. The other end of the pipe 97 is connected with the passage 79 in the ram piston 78.

The pipe 96 is connected with a two-way valve 98 having a piston 99 operable by a handle 100 and connected with a pressure main 101, the pipe 96, and an exhaust main 102. Operation of the handle 100 causes fluid to be passed either from the pressure main 101 to the pipe 96, or from the pipe 96 to the exhaust main 102. The pressure main 101 is also connected by a pressure branch 103 with the passage 80 in the ram piston 78.

In the standing position, piston 99 shuts off pipe 96 and pressure fluid from the pressure main 101 and pressure branch 103 maintain the piston 84 in its lowest position in the cylinder 85, and pressure on the collar 76a (which is secured to the skirt 76) combined with the effect of gravity, maintain the cradle in its lowest position.

The action is as follows: when the coil 73 and spool 74 have been placed in the cradle 75, and the contact bolt 89 has been adjusted to its correct position for a spool of the diameter employed, the operator moves the operating handle 100 to the "up" position, thereby admitting pressure fluid to the pipe 96, and in consequence to the under side of the piston 84. Since the effective area of this under side is greater than that of the upper side, the piston moves upwards, carrying with it the gauging rod 81 independently of cradle 75, until the roller 82 comes into contact with the spool 74, after which resistance to further ingress into the cylinder 85 causes a diversion of the pressure fluid to the cylinder 93, pipe 97, passage 79, and thence to the space above the piston 78, whereby the cradle 75 is forced upwards, so hoisting the work. Owing to the continuance of the pressure on the piston 84, the gauging rod 81 also moves up with the work, the roller 82 maintaining contact with the spool 74.

When the requisite height has been reached, the contact bolt 89 forces the plunger 91 upward against the spring 92, so cutting off the port to the pipe 96 and halting the flow of pressure fluid to the passage 79. The cradle 75 is thus locked in the required position to enable the cones 10 to be entered on the spool 74.

When the handle 100 is moved to the "down" position, the pressure main 101 is cut off from the valve 98, and the exhaust main 102 is opened to the pipe 96. The pressure branch 103 is still connected with the passage 80, and the cradle 75 is therefore forced down by fluid pressure on the collar 76a, assisted by gravity. Similarly the piston 84 is forced down, and so the hoist returns to its standing position.

Figures 6A and 6B show diagrammatically an electromechanical strip uncoiler, the hoist for clarity being shown separate from the cone operating mechanism.

The cones 10 are rotatably mounted in cone heads 104 having lateral ribs 48 slidable in guideways on a base 48a so as to permit movement of the cone heads 104 towards or away from one another. Each cone head has a dependent lug 105 apertured and in threaded engagement with a traversing screw 106 rotatably mounted in bearings 107, 108 and driven through a worm wheel 109 by a worm shaft 110 coupled to an electric cone traversing motor 111 having an electromagnetic brake 119. The underside of each lug 105 has a ramp 112 secured thereto for engagement with limit switches 113, 114, and the limit switches and cone traversing motors are connected electrically with a control panel 115 having press buttons 116, 117, 118 for "start," "stop," and "re-set" respectively. The cone heads 104 and cones 10 may thus be moved inwards or outwards as required, within the limits set by the limit switches.

The coil 11 to be unwound is supported by rollers 14 on a cradle 120, on which is mounted a gauge arm 24 having a cam plate 30 and transversely slidable relatively to the cradle 120 under the influence of a weight 121 secured to one arm of a bell-crank lever 122 pivotally mounted on a lug 123 projecting from the cradle, the bell-crank lever 122 being connected with the gauge arm 24 by a link 124.

The cradle 120 is carried on a vertical threaded jack member 125 within a correspondingly threaded sleeve 126 having at its lower end a worm wheel 127 driven by a worm 128. The sleeve 126 is rotatably carried in an outer casing 129 which constitutes the base frame of the hoist, and the cradle 120 is slidable vertically between suitable guides (not shown) extending upwards from the casing 129.

The worm 128 is driven by an electric jack motor 130 having an electro-magnetic brake 131, the motor and brake being suitably connected by pairs of conductors 130a, 130b and 131a, respectively, with the control panel 115. A jack lift limit switch 132 operable by the cam plate 30 is also connected by conductor pair 132a with the control panel 115.

In the standing position of the apparatus, that is, when the cones are fully drawn back and the jack is in its lowest position, the weight 121 is supported on a stop block 133.

In operation, the coil 11 is placed on the rollers 14 and the jack motor 130 is energized, causing the cradle 120 to start its upward movement. During this initial movement the weight 121 continues to lie on the stop block 133 and its weight causes the bell-crank lever 122 to turn about its pivot on the rising lug 123 and, by means of the link 124, to pull the guage bar 24 towards the coil 11. When the guage bar engages the coil 11, this movement of the link 24 and bell-crank lever 122, relatively to the cradle 120, is stopped, so that the continued upward movement of the cradle 120 results in the weight 121 being lifted clear of the stop block 133. It is in this phase of the movement that the apparatus is shown in Figure 6B.

Further upward movement of the cradle brings the cam plate 30 into contact with the pivoted roller of the jack lift limit switch 132, which is operated by the cam plate, when the requisite height has been attained, to cut out the jack motor 130 and leave the coil 11 standing at the correct height for the cones 10 to enter. The jack lift limit switch 132 is also arranged to start the cone traversing motors 111 to drive the traversing screws 105, so causing the cone heads 104 to move towards one another, until each motor is individually cut out by action of the ramps 112 on the limit switches 114. The inward movement of the cone heads 104 need not be simultaneous, as the limit switches 114 are located so as to halt the heads when they are in the required position. The limit switches 114 are also arranged so that when both have been tripped by the ramps 112 the jack motor 130 is energized in the reverse direction so that the cradle 120 and its associated components are returned to the standing position. The return movement of the cone heads 104 is controlled by the press button 118.

Other applications of the invention may include the lifting and positioning of any forging or casting of regular cross section prior to machining operations or the pre-setting of any part of a machine tool or other apparatus, the position of which is determinable by the dimensions of the work to be entered into the machine. The invention is not limited, moreover, to loads of circular cross-section. and suitably shaped and disposed gauge bars and cams may be provided to handle loads of rectangular or other cross-sections, or the invention may be applied to the presetting of the upper blade of a shearing machine of the up-cutting type.

I claim:

1. A power-driven automatic locating gear for locating a load relatively to a predetermined axis comprising a base frame, a cradle movable relatively to said frame and serving to receive the load, gauging means arranged to assess the relevant dimensons of said load upon said cradle, operating means for moving said cradle, and control means responsive to said gauging means for causing said operating means to locate the load relative to the predetermined axis.

2. A power-driven automatic locating gear for locating a load relatively to a predetermined axis comprising a base frame, a cradle movable relatively to said frame and serving to receive the load, gauging means arranged to assess the relevant dimensions of said load upon said cradle, operating means for elevating said cradle, and control means responsive to said gauging means for causing said operating means to center said load relative to said predetermined axis.

3. A power-driven automatic locating gear for locating a load relatively to a predetermined axis comprising a base frame, a cradle movable relatively to said frame and serving to receive the load, a vertical gauging member carried on said cradle and movable laterally relatively thereto, said gauging member being arranged to assess the relevant dimensions of said load, operating means for moving said cradle, and control means responsive to said gauging member for causing said operating means to locate said load relative to the predetermined axis.

4. A power-driven automatic locating gear for locating a load relatively to a predetermined axis comprising a base frame, a cradle movable vertically relatively to said frame and serving to receive the load, a vertical gauging member carried on said cradle and movable laterally relatively thereto, a cam plate vertically movable with said cradle and laterally with said gauging member, said gauging member being arranged to assess the relevant dimensions of said load, operating means for elevating said cradle, and means actuatable by said cam plate for controlling said operating means upon elevation of said cradle to maintain said cradle and load relative to the predetermined axis.

5. A hydraulic automatic locating gear for locating a load relatively to a predetermined axis comprising a base frame, a cradle serving to receive the load, means to move the cradle vertically relatively to said frace, a vertical hydraulically operated gauging member carried on the cradle, means to move said member laterally relatively to the cradle, a hydraulic control valve, a cam plate arranged to be movable vertically with the cradle and laterally with the gauging member, said gauging member being arranged to assess the relevant dimensions of said load, a source of fluid pressure, and a hydraulic ram operated thereby and arranged to lift the cradle and to be arrested by operation of the cam plate on the hydraulic control valve when the requisite upward travel of the cradle has been effected.

6. A hydraulic automatic locating gear as in claim 5 further comprising a base, two rotatable adjustable cones mounted thereon and adapted to receive said load from said cradle, means to traverse said cones relatively to the base along said predetermined axis towards and away from one another, and a cone traverse control element responsively connected to the hydraulic control valve of the locating gear.

7. A hydraulic strip uncoiler for a coiled strip comprising a source of fluid pressure, a base, two rotatable adjustable cones mounted thereon, means to traverse the cones relatively to the base along a horizontal axis towards and away from one another, automatic locating gear, for locating the coiled strip relatively to said horizontal axis, disposed between and below said cones and comprising a main frame, a cradle serving to receive the coiled strip, a hydraulic ram arranged to move the cradle vertically, a vertical hydraulically operated gauging member carried on the cradle, means to move said gauging member laterally relatively to the cradle, a hydraulic control valve, a cam plate arranged to be movable vertically with the cradle and laterally with the gauging member, said gauging member being arranged to assess the relevant dimensions of said coiled strip, means to arrest the hydraulic ram by operation of the cam plate on the hydraulic control valve when the requisite upward travel of the cradle has been effected, and two adjustable stop valves arranged to be operable by the inward movement of the cones to a predetermined position and to control the return of the hydraulic ram and the cradle to their initial position.

8. A power-driven automatic locating gear as claimed in claim 2, said control means comprising a control member, said guaging means being movable vertically with said cradle relatively to said control member and serving to actuate said control member to control said operating means.

9. A power driven locating gear as in claim 4, further comprising a base, two rotatable adjustable cones mounted thereon, mechanical means for traversing the cones relatively to the base along said axis towards and away from one another, and electrical controlling means for the cone traversing means operable by the inward movement of the cones to a predetermined position, to arrest the cones and to control the return of the cradle to its initial position.

ROBERT GORDON RUSSELL.

REFERENCES CITED

The following references are of record in the file of this patent:

UNITED STATES PATENTS

| Number | Name | Date |
|---|---|---|
| 2,066,377 | Wean et al. | Jan. 5, 1937 |
| 2,177,577 | Mikaelson | Oct. 24, 1939 |
| 2,250,025 | Klein | July 22, 1941 |